United States Patent
Kuraya et al.

(10) Patent No.: US 9,013,755 B2
(45) Date of Patent: Apr. 21, 2015

(54) IMAGE PROCESSING DEVICE FOR DETERMINING OUTPUT RESOLUTION AND CONVERTING SCAN DATA INTO IMAGE DATA INDICATING OUTPUT RESOLUTION

(75) Inventors: Mayumi Kuraya, Nagoya (JP); Tomohiko Hasegawa, Okazaki (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 0 days.

(21) Appl. No.: 13/363,325

(22) Filed: Jan. 31, 2012

(65) Prior Publication Data
US 2012/0250101 A1   Oct. 4, 2012

(30) Foreign Application Priority Data
Mar. 30, 2011   (JP) .................. 2011-076311

(51) Int. Cl.
G06K 15/00 (2006.01)
H04N 1/40 (2006.01)
G06K 9/00 (2006.01)
G06K 15/02 (2006.01)

(52) U.S. Cl.
CPC ........ H04N 1/40068 (2013.01); G06K 9/00456 (2013.01); G06K 2209/01 (2013.01)

(58) Field of Classification Search
CPC .......... H04N 1/40068; G06K 9/00456; G06K 2209/01
USPC ............ 358/448, 1.2, 1.9, 1.15, 2.1; 351/205, 351/246, 690; 345/690
See application file for complete search history.

(56) References Cited

U.S. PATENT DOCUMENTS

| | | | |
|---|---|---|---|
| 5,796,928 A | 8/1998 | Toyomura et al. | |
| 7,031,003 B2* | 4/2006 | Nagai et al. | 358/1.13 |
| 2002/0167690 A1 | 11/2002 | Fujii | |
| 2003/0048487 A1 | 3/2003 | Johnston et al. | |
| 2003/0218762 A1 | 11/2003 | Edwards et al. | |
| 2004/0056960 A1 | 3/2004 | Hayashi | |
| 2004/0105129 A1* | 6/2004 | Kawakami | 358/2.1 |
| 2005/0104975 A1 | 5/2005 | Hayashi | |

(Continued)

FOREIGN PATENT DOCUMENTS

| | | |
|---|---|---|
| CN | 101193186 A | 6/2008 |
| CN | 101662558 A | 3/2010 |

(Continued)

OTHER PUBLICATIONS

European Patent Office, extended European Search Report for European Patent Application No. 12153501.7 (counterpart to above-captioned patent application), dated May 3, 2012.

(Continued)

Primary Examiner — Houshang Safaipour
Assistant Examiner — Walter Yehl
(74) Attorney, Agent, or Firm — Merchant & Gould PC

(57) ABSTRACT

An image processing device may calculate, by utilizing scan data obtained by a scan of a document including a natural image in accordance with a specific optical resolution, a first type of index value for classifying the document, determine an output resolution by utilizing the first type of index value, convert the scan data indicating the specific optical resolution into image data indicating the output resolution in a case where the output resolution is not identical to the specific optical resolution, and create a file including the image data indicating the output resolution.

8 Claims, 10 Drawing Sheets

Output Resolution Determination Table 44a (In Case of Optical Resolution = 300(dpi))

| Character Analysis Result | Photo Analysis Result | Output Resolution (dpi) |
|---|---|---|
| Smallest Character Point<5pt | | 300 |
| 5pt≤ Smallest Character Point ≤10.5pt | ER>2.8(High Fineness) | 300 |
| | 1.0≤ER≤2.8(Medium Fineness) | 200 |
| | ER<1.0(Low Fineness) | 200 |
| 10.5pt< Smallest Character Point No Character | ER>2.8(High Fineness) | 300 |
| | 1.0≤ER≤2.8(Medium Fineness) | 200 |
| | ER<1.0(Low Fineness) | 100 |

(In Case of Optical Resolution = 600(dpi))

| Character Analysis Result | Photo Analysis Result | Output Resolution (dpi) |
|---|---|---|
| Smallest Character Point<5pt | | 600 |
| 5pt≤ Smallest Character Point ≤10.5pt | ER>2.8(High Fineness) | 600 |
| | 1.0≤ER≤2.8(Medium Fineness) | 400 |
| | ER<1.0(Low Fineness) | 400 |
| 10.5pt< Smallest Character Point No Character | ER>2.8(High Fineness) | 600 |
| | 1.0≤ER≤2.8(Medium Fineness) | 400 |
| | ER<1.0(Low Fineness) | 300 |

(56) References Cited

U.S. PATENT DOCUMENTS

| | | | |
|---|---|---|---|
| 2005/0206912 A1 | 9/2005 | Megawa | |
| 2005/0248778 A1 | 11/2005 | Kim | |
| 2006/0039609 A1* | 2/2006 | Takano | 382/190 |
| 2006/0103882 A1 | 5/2006 | Tonegawa | |
| 2006/0215910 A1 | 9/2006 | Megawa | |
| 2007/0146732 A1 | 6/2007 | Piazza et al. | |
| 2007/0257422 A1 | 11/2007 | Suzuki | |
| 2007/0273771 A1 | 11/2007 | Hayashi | |
| 2007/0285737 A1 | 12/2007 | Takara | |
| 2008/0123162 A1* | 5/2008 | Sugiura | 358/488 |
| 2009/0051951 A1 | 2/2009 | Saida | |
| 2009/0231598 A1 | 9/2009 | Kimura | |
| 2009/0303508 A1 | 12/2009 | Tanaka | |
| 2010/0002257 A1 | 1/2010 | Isshiki | |
| 2010/0058180 A1 | 3/2010 | Hirayama et al. | |
| 2010/0118344 A1 | 5/2010 | Asano | |
| 2010/0123926 A1 | 5/2010 | Kitani | |
| 2010/0134853 A1 | 6/2010 | Suzuki | |
| 2011/0013202 A1 | 1/2011 | Muramatsu | |
| 2011/0019229 A1 | 1/2011 | Hayashi et al. | |
| 2011/0317227 A1 | 12/2011 | Makishima et al. | |
| 2012/0212787 A1 | 8/2012 | Hasegawa | |
| 2012/0250100 A1 | 10/2012 | Kuraya et al. | |
| 2012/0250102 A1 | 10/2012 | Kuraya et al. | |
| 2013/0060918 A1 | 3/2013 | Butler et al. | |

FOREIGN PATENT DOCUMENTS

| | | |
|---|---|---|
| EP | 1605348 A2 | 12/2005 |
| EP | 2086212 A1 | 8/2009 |
| JP | H01-177258 A | 7/1989 |
| JP | H01-268253 A | 10/1989 |
| JP | H07-177359 A | 7/1995 |
| JP | H09-046512 A | 2/1997 |
| JP | H11-187252 A | 7/1999 |
| JP | H11-261879 A | 9/1999 |
| JP | 2000-125117 A | 4/2000 |
| JP | 2000-209436 A | 7/2000 |
| JP | 2000-307818 A | 11/2000 |
| JP | 2001-022138 A | 1/2001 |
| JP | 2002-142106 A | 5/2002 |
| JP | 2002-335386 A | 11/2002 |
| JP | 2003-046734 A | 2/2003 |
| JP | 2003-219150 A | 7/2003 |
| JP | 2004-363795 A | 12/2004 |
| JP | 2005-005946 A | 1/2005 |
| JP | 2005-278174 A | 10/2005 |
| JP | 2007-122255 A | 5/2007 |
| JP | 2007-274617 A | 10/2007 |
| JP | 2008-034903 A | 2/2008 |
| JP | 2009-296533 A | 2/2009 |
| JP | 2009-182705 A | 8/2009 |
| JP | 2009-219055 A | 9/2009 |
| JP | 2010-056827 A | 3/2010 |
| JP | 2010-120195 A | 6/2010 |

OTHER PUBLICATIONS

Japan Patent Office, Notification of Reasons for Rejection for Japanese Patent Application No. 2011-033641 (counterpart Japanese patent application), mailed Jan. 8, 2013.
European Patent Office, extended European Search Report for European Patent Application No. 12153353.3 (counterpart European patent application), dated Jan. 16, 2013.
Japan Patent Office, Notification of Reasons for Rejection for Japanese Patent Application No. 2011-076309 (counterpart to co-pending U.S. Appl. No. 13/363,333), mailed Feb. 26, 2013.
Japan Patent Office, Notification of Reasons for Rejection for Japanese Patent Application No. 2011-076310 (counterpart to co-pending U.S. Appl. No. 13/363,177), mailed Feb. 26, 2013.
Japan Patent Office, Notification of Reasons for Rejection for Japanese Patent Application No. 2011-076311 (counterpart to above-captioned patent application), mailed Feb. 26, 2013.
European Patent Office, Office Action for European Patent Application No. 12153501.7 (counterpart to co-pending U.S. Appl. No. 13/365,724), dated Mar. 21, 2013.
European Patent Office, Extended European Search Report for European Patent Application No. 12153356.6 (counterpart to above-captioned patent application), dated Apr. 9, 2013.
European Patent Office, Office Action for European Patent Application No. 12153353.3 (related to above-captioned patent application), mailed Oct. 31, 2013.
United States Patent and Trademark Office, Final Office Action for U.S. Appl. No. 13/363,333 (related to above-captioned patent application), mailed Sep. 30, 2013.
United States Patent and Trademark Office, Office Action for U.S. Appl. No. 13/363,333 (related to above-captioned patent application), mailed Jun. 17, 2013.
Japan Patent Office, Decision of Rejection for Japanese Patent Application No. 2011-033641 (related to above-captioned patent application), mailed Jun. 25, 2013.
Japan Patent Office, Notification of Reasons for Rejection for Japanese Patent Application No. 2011-076311 (counterpart to above-captioned patent application), mailed Jun. 25, 2013.
U.S. Patent and Trademark Office, Non-Final Office Action for U.S. Appl. No. 13/365,724 (related to the above-captioned application), mailed Aug. 15, 2013.
European Patent Office, Extended European Search Report for EP Patent Application No. 12153342.6 (counterpart of application related to the above-captioned application), mailed Aug. 22, 2013.
Chinese Office Action issued in CN 201210021653.9, mailed Apr. 2, 2014.
Office Action issued in related application U.S. Appl. No. 13/363,333, mailed Mar. 21, 2014.
Office Action issued in U.S. Appl. No. 13/363,177, mailed Dec. 23, 2013.
Office Action issued in U.S. Appl. No. 13/363,325, mailed Jan. 17, 2014.
Chinese Office Action issued in CN201210023771.3, mailed Jan. 27, 2014.
European Office Action issued in EP 12 153 356.6, mailed Feb. 7, 2014.
Notification of the Second Office Action for Chinese Patent Application No. 201210023771.3 issued Aug. 20, 2014.
Office Action issued in related U.S. Appl. No. 14/263,409, mailed Oct. 6, 2014.
Chinese Office Action issued in JP 201210023771.3, mailed Aug. 20, 2014.
Japanese Office Action issued in JP 2013-134902, mailed Jul. 22, 2014.
Japanese Office Action issued in JP 2013-190920, mailed Jul. 1, 2014.
Office Action issued in related Chinese application No. 201210021653.9, mailed Oct. 31, 2014.
European Office Action for Corresponding EP Application No. 12153353.3 mailed Jan. 26, 2015 (6 pages).
Chinese Office Action issued in Application No. 20120023771.3, mailed Feb. 2, 2015.

* cited by examiner

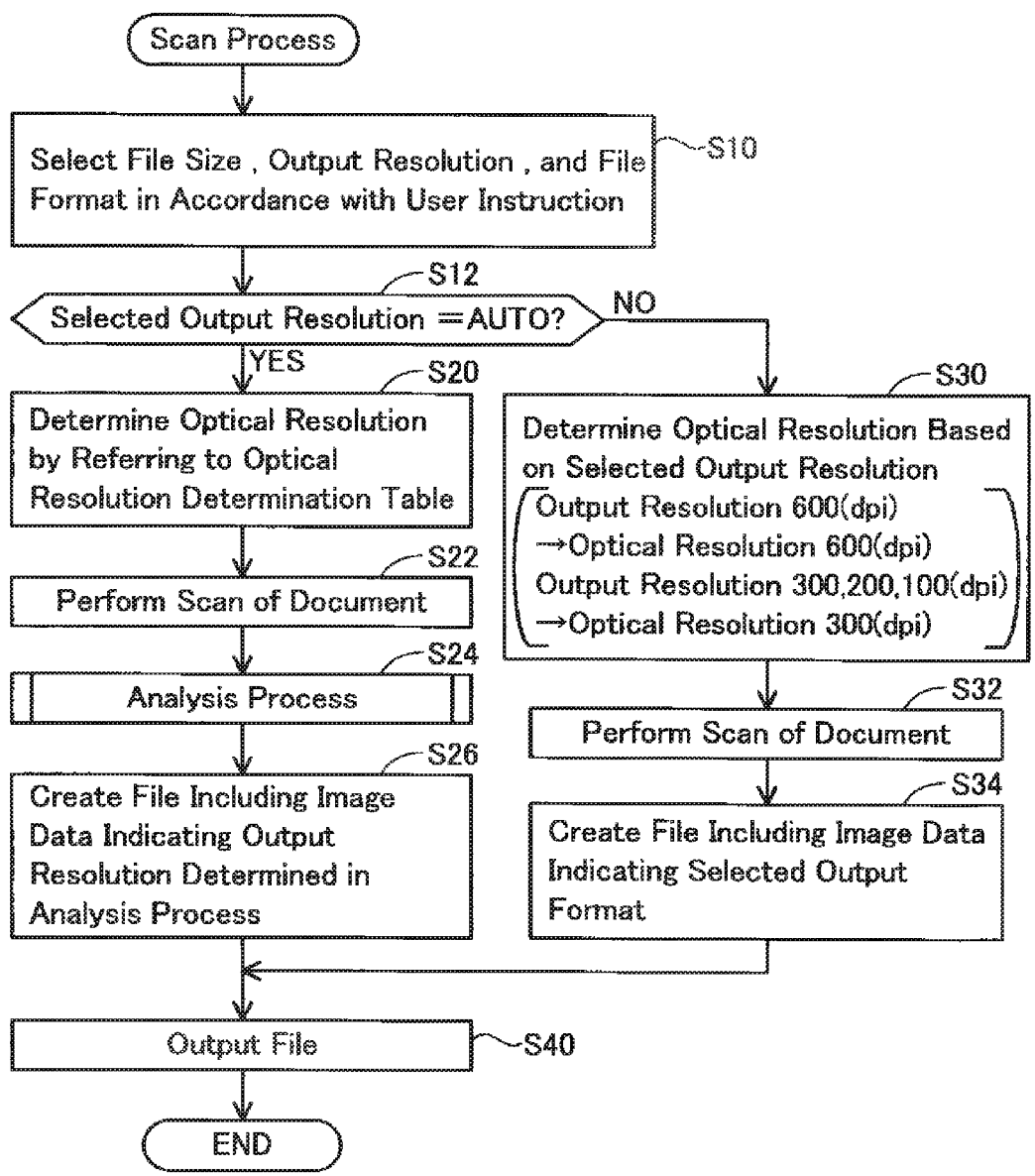

FIG. 3

Optical Resolution Determination Table 42

| File Size | File Format | Optical Resolution (dpi) |
|---|---|---|
| Large | JPEG | 600 |
| | XPS、PDF、PDF/A、Encryption PDF、Signature Enclosed PDF、Searchable PDF、High-Compression PDF | 300 |
| Medium | JPEG | 600 |
| | XPS、PDF、PDF/A、Encryption PDF、Signature Enclosed PDF、Searchable PDF、High-Compression PDF | 300 |
| Small | JPEG | 300 |
| | XPS、PDF、PDF/A、Encryption PDF、Signature Enclosed PDF、Searchable PDF、High-Compression PDF | 300 |

FIG. 5
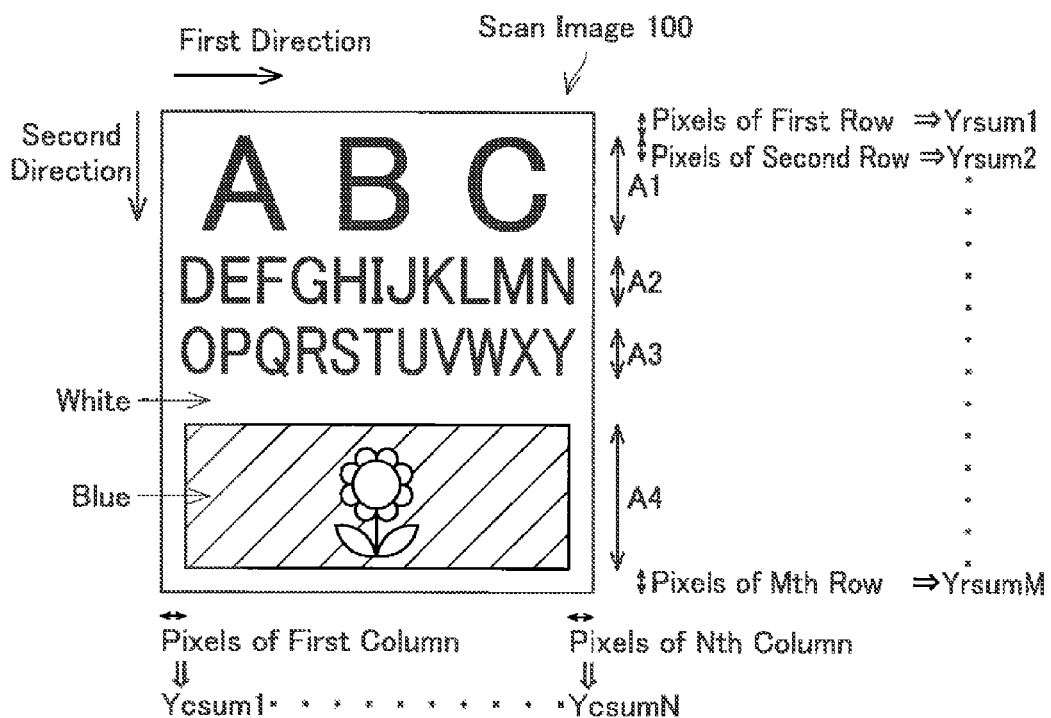
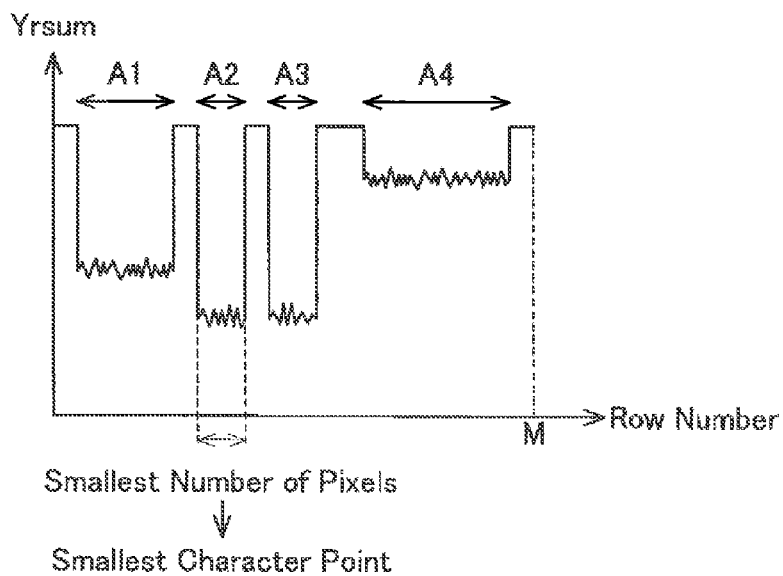

FIG. 7

Output Resolution Determination Table 44a (In Case of Optical Resolution = 300(dpi))

| Character Analysis Result | Photo Analysis Result | Output Resolution (dpi) |
|---|---|---|
| Smallest Character Point<5pt | | 300 |
| 5pt≤ Smallest Character Point ≤10.5pt | ER>2.8(High Fineness) | 300 |
| | 1.0≤ER≤2.8(Medium Fineness) | 200 |
| | ER<1.0(Low Fineness) | 200 |
| 10.5pt< Smallest Character Point No Character | ER>2.8(High Fineness) | 300 |
| | 1.0≤ER≤2.8(Medium Fineness) | 200 |
| | ER<1.0(Low Fineness) | 100 |

(In Case of Optical Resolution = 600(dpi))

| Character Analysis Result | Photo Analysis Result | Output Resolution (dpi) |
|---|---|---|
| Smallest Character Point<5pt | | 600 |
| 5pt≤ Smallest Character Point ≤10.5pt | ER>2.8(High Fineness) | 600 |
| | 1.0≤ER≤2.8(Medium Fineness) | 400 |
| | ER<1.0(Low Fineness) | 400 |
| 10.5pt< Smallest Character Point No Character | ER>2.8(High Fineness) | 600 |
| | 1.0≤ER≤2.8(Medium Fineness) | 400 |
| | ER<1.0(Low Fineness) | 300 |

FIG. 9

Analysis Performing Determination Table 46

| Document Setting Position | File Format | Character Analysis | Photo Analysis | Remarks | |
|---|---|---|---|---|---|
| ADF | JPEG | ON | ON | Both Character and Photo | (Note1) |
| ADF | XPS | ON | OFF | Specialize in Character | (Note3) |
| ADF | PDF | ON | OFF | Specialize in Character | |
| ADF | PDF/A | OFF | OFF | Highest Resolution | (Note5) |
| ADF | Encryption PDF | ON | OFF | Specialize in Character | (Note6) |
| ADF | Signature Enclosed PDF | OFF | OFF | Predetermined Resolution Equal to or Higher than 300dpi | |
| ADF | Searchable PDF | ON | OFF | Specialize in Character | |
| ADF | High-Compression PDF | ON | ON | Both Character and Photo | |
| FB | JPEG | OFF | ON | Specialize in Photo | (Note2) |
| FB | XPS | ON | ON | Both Character and Photo | (Note4) |
| FB | PDF | ON | ON | Both Character and Photo | |
| FB | PDF/A | OFF | OFF | Highest Resolution | (Note5) |
| FB | Encryption PDF | ON | OFF | Specialize in Character | (Note6) |
| FB | Signature Enclosed PDF | OFF | OFF | Predetermined Resolution Equal to or Higher than 300dpi | |
| FB | Searchable PDF | ON | OFF | Specialize in Character | |
| FB | High-Compression PDF | ON | ON | Both Character and Photo | |

FIG. 10

Output Resolution Determination Table 44b (In Case of Optical Resolution = 300(dpi))

| Character Analysis Result | Output Resolution (dpi) |
|---|---|
| Smallest Character Point < 5pt | 300 |
| 5pt ≤ Smallest Character Point ≤ 10.5pt | 200 |
| 10.5pt < Smallest Character Point<br>No Character | 100 |

| Photo Analysis Result | Output Resolution (dpi) |
|---|---|
| ER > 2.8 (High Fineness) | 300 |
| 1.0 ≤ ER ≤ 2.8 (Medium Fineness) | 200 |
| ER < 1.0 (Low Fineness) | 100 |

(In Case of Optical Resolution = 600(dpi))

| Character Analysis Result | Output Resolution (dpi) |
|---|---|
| Smallest Character Point < 5pt | 600 |
| 5pt ≤ Smallest Character Point ≤ 10.5pt | 400 |
| 10.5pt < Smallest Character Point<br>No Character | 300 |

| Photo Analysis Result | Output Resolution (dpi) |
|---|---|
| ER > 2.8 (High Fineness) | 600 |
| 1.0 ≤ ER ≤ 2.8 (Medium Fineness) | 400 |
| ER < 1.0 (Low Fineness) | 300 |

IMAGE PROCESSING DEVICE FOR DETERMINING OUTPUT RESOLUTION AND CONVERTING SCAN DATA INTO IMAGE DATA INDICATING OUTPUT RESOLUTION

CROSS-REFERENCE TO RELATED APPLICATIONS

This application claims priority to Japanese Patent Application No. 2011-076311, filed on Mar. 30, 2011, the contents of which are hereby incorporated by reference into the present application.

TECHNICAL FIELD

The technique disclosed in the present specification relates to an image processing device for converting scan data into image data indicating an output resolution.

DESCRIPTION OF RELATED ART

For example, a digital multi-function device comprising a scan function is known. The digital multi-function device performs a scan of a document so as to create scan data. Next, the digital multi-function device performs an analysis of the scan data so as to calculate a size of the smallest character included in the document. In a case where the size of the smallest character is relatively small, the digital multi-function device determines a relatively high output resolution, and in a case where the size of the smallest character is relatively large, the digital multi-function device determines a relatively low output resolution. The digital multi-function device thou converts scan data into image data indicating the determined output resolution.

SUMMARY

With the technique described above, an output resolution may not be appropriately determined as to scan data representing a document not including a character (for example, a document only including a natural image (a photograph or the like)) or scan data representing a document including both a character and a natural image. The present specification provides a technique that may appropriately determine an output resolution.

The present specification discloses an image processing device. The image processing device may comprise one or more processors, and a memory that stores a computer program including instructions executed by the one or more processors. The instructions may cause the one or more processors, when executed by the one or more processors, to functions as: a first analysis unit configured to calculate, by utilizing scan data obtained by a scan of a document including a natural image in accordance with a specific optical resolution, a first type of index value for classifying the document; an output resolution determination unit configured to determine an output resolution by utilizing the first type of index value, the output resolution being a resolution for image data obtained by utilizing the scan data; a conversion unit configured to convert the scan data indicating the specific optical resolution into the image data indicating the output resolution in a case where the output resolution is not identical to the specific optical resolution; and a creation unit configured to create a file including the image data indicating the output resolution.

Moreover, a controlling method and a computer program for realizing the image processing device and a non-transitory computer-readable storage medium that stores the computer program are also novel and useful.

BRIEF DESCRIPTION OF THE DRAWINGS

FIG. 2 shows a flow chart of a scan process;

FIG. 3 shows an example of an optical resolution determination table;

FIG. 5 shows a diagram for explaining contents of a character analysis;

FIG. 7 shows an example of an output resolution determination table;

FIG. 9 shows an example of an analysis performing determination table; and

FIG. 10 shows an example of an output resolution determination table.

EMBODIMENT (First Embodiment)
(System Configuration)

Figure 1:
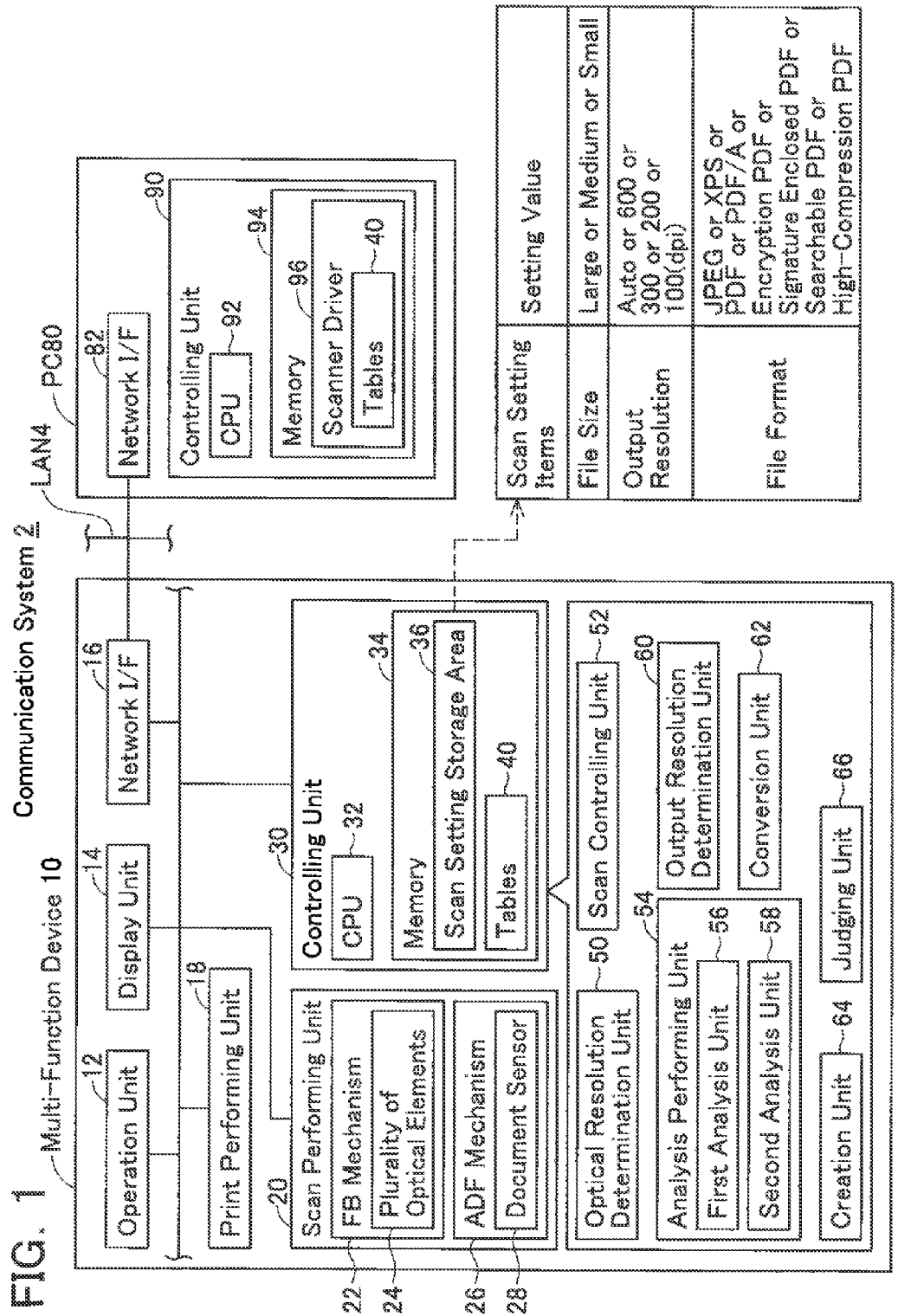
FIG. 1 shows an example of a configuration of a communication system.

As shown in FIG. 1, a communication system 2 comprises a multi-function device 10 (a peripheral device of a PC 80) and the PC 80. The multi-function device 10 and the PC 80 are connected to a LAN 4. The multi-function device 10 and the PC 80 are capable of communicating with each other via the LAN 4.

(Configuration of Multi-Function Device 10)

The multi-function device 10 is capable of performing a plurality of functions including a print function and a scan function. The multi-function device 10 comprises an operation unit 12, a display unit 14, a network interface 16, a print performing unit 18, a scan performing unit 20, and a controlling unit 30. The respective units 12 to 30 are connected to a bus line (reference numeral omitted).

The operation unit 12 comprises a plurality of keys. By operating the operation unit 12, a user can input various instructions to the multi-function device 10. The display unit 14 is a display for displaying various types of information. The network interface 16 is connected to the LAN 4. The print performing unit 18 comprises a printing mechanism adopting an inkjet head system, a laser system, or the like, and performs printing in accordance with an instruction from the controlling unit 30. The scan performing unit 20 comprises a scanning mechanism such as a CCD, a CIS, or the like, and performs a scan of a document in accordance with an instruction from the controlling unit 30.

The scan performing unit 20 comprises an FB (Flat Bed) mechanism 22. The FB mechanism 22 comprises a transparent plate (not shown) and a plurality of optical elements 24 aligned in a first direction. Each optical element 24 may be a CCD image sensor (Charge Coupled Device Image Sensor) or a CIS (Contact Image Sensor). The plurality of optical elements 24 is movable in a second direction that is perpendicular to the first direction (the direction in which the plurality of optical elements 24 is aligned). Therefore, by utilizing the FB mechanism 22, a color scan of a document placed an the transparent plate can be performed by moving the plurality of optical elements 24 in the second direction without having to move the document. Hereinafter, a scan of a document placed on the transparent plate will be referred to as an "FB scan".

The scan performing unit 20 further comprises an ADF (Auto Document Feeder) mechanism 26. The ADF mechanism 26 is capable of moving a document in the second direction. Therefore, by utilizing the ADF mechanism 26, a color scan of a document can be performed by moving the document in the second direction without having to move the plurality of optical elements 24. Hereinafter, a scan of a document conveyed by the ADF mechanism 26 will be referred to as an "ADF scan". Moreover, the ADF mechanism 26 comprises a document sensor 28. The document sensor 28 detects whether a document is placed on the ADF mechanism 26 or not, and supplies a detection result to the controlling unit 30.

The controlling unit 30 comprises a CPU 32 and a memory 34. The CPU 32 performs various processes in accordance with a program (not shown) stored in the memory 34. Respective functions of an optical resolution determination unit 50, a scan controlling unit 52, an analysis performing unit 54, an output resolution determination unit 60, a conversion unit 62, a creation unit 64, and a judging unit 66 are realized due to the CPU 32 performing processes in accordance with the program. Moreover, the analysis performing unit 54 comprises a first analysis unit 56 and a second analysis unit 58.

The memory 34 is constituted by a nonvolatile memory, a volatile memory, or the like. The memory 34 comprises a scan setting storage area 36. The memory 34 further stores tables 40 (refer to FIGS. 3 and 7). Contents of information stored in the scan setting storage area 36 and contents of the tables 40 will be described in detail later. Moreover, the tables 40 are stored in advance in the multi-function device 10 before shipping of the multi-function device 10. However, alternatively, the multi-function device 10 may obtain (in other words, install) the tables 40 from a medium (for example, a USB memory) provided by a vendor of the multi-function device 10 or may obtain the tables 40 from a server provided by the vendor of the multi-function device 10.

(Configuration of PC 80)

The PC 80 comprises a network interface 82 and a controlling unit 90. The PC 80 further comprises an operation unit and a display unit (both not shown). The network interface 82 is connected to the LAN 4.

The controlling unit 90 comprises a CPU 92 and a memory 94. The CPU 92 performs various processes in accordance with a program (for example, a scanner driver 96) stored in the memory 94. The memory 94 is constituted by a nonvolatile memory, a volatile memory, or the like. The memory 94 stores the scanner driver 96 for utilizing the scan function of the multi-function device 10. The PC 80 obtains (in other words, installs) the scanner driver 96 from a medium that is shipped together with the multi-function device 10. However, alternatively, the PC 80 may obtain the scanner driver 96 from a server provided by the vendor of the multi-function device 10. Moreover, while FIG. 1 shows the tables 40 stored in the multi-function device 10 also being included in the scanner driver 96, this configuration is utilized in a modification which will be described later.

(Scan Process: FIG. 2)

Processes performed by the multi-function device 10 will now be described. After placing a document at a predetermined position of the multi-function device 10, the user operates the operation unit 12 of the multi-function device 10 to input an instruction to perform a color scan to the multi-function device 10. Moreover, in a case where the user desires to have an ADF scan performed, the user places the document on the ADF mechanism 26. On the other hand, in a case where the user desires to have an FB scan performed, the user places the document on the transparent plate of the FB mechanism 22.

When the instruction for performing the color scan is inputted, the controlling unit 30 causes the display unit 14 to display a selection screen that enables the user to select scan settings. In the present embodiment, as shown in FIG. 1, a plurality of scan setting items including "file size", "output resolution", and "file format" is provided.

(File Size)

"File size" refers to a file size of a file that is a creation object (hereinafter referred to as an "object file"). In the present embodiment, three file sizes ("large", "medium", and "small") are adopted as setting values that can be designated by the user. Moreover, while three file sizes are adopted in the present embodiment, two file sizes (for example, "large" and "small") may be adopted or four or more file sizes may be adopted in a modification.

(Output Resolution)

"Output resolution" refers to a resolution indicated by image data included in the object file. Moreover, although a detailed description will be provided later, the "output resolution" is to be distinguished from an optical resolution that is utilized when the scan performing unit 20 actually performs the scan. In the present embodiment, five output resolutions ("Auto", "600 dpi", "300 dpi", "200 dpi", and "100 dpi"") are adopted as setting values that can be designated by the user. As will be described later, "Auto" is a setting value that causes the multi-function device 10 to automatically determine an optical resolution and an output resolution. Moreover, in the present embodiment, while four output resolutions ("600 dpi", "300 dpi", "200 dpi", and "100 dpi"") are adopted as output resolutions having specific numerical values, three or less or five or more output resolutions may be adopted in a modification.

(File Format)

"File format" refers to a file format of the object file. More specifically, the "file format" is specified by an extension (for example, ".jpg", ".pdf", and ".xps") included in a file name of the object file. In the present embodiment, three file formats ("JPEG (Joint Photographic Experts Group)", "XPS (XML Paper Specification)", and "PDF (Portable Document Format)") are adopted as setting values that can be designated by the user. However, PDF is classified into six file formats ("PDF", "PDF/A", "Encryption PDF", "Signature Enclosed PDF", "Searchable PDF", and "high-compression PDF").

The "PDF" refers to a normal PDF that does not belong to the other five PDF types ("PDF/A", "Encryption PDF", and the like). The "PDF/A" is an international standard established by the ISO and is a PDF designed for long-term data storage. The "encryption PDF" is a PDF in which data is encrypted using a password. Accordingly, in a case where selecting the encryption PDF, the user additionally inputs a password. The "signature Enclosed PDF" is a PDF enclosing a digital signature (for example, a time stamp). In a ease where selecting the signature enclosed PDF, the user must install a digital signature in the multi-function device 10 in advance. The "searchable PDF" is a PDF enclosing characters included in a document (for example, characters read by an OCR (Optical Character Reader)) as searchable text data. The "high-compression PDF" is a PDF in which a character region and a background region of a document are separated from each other and separately compressed, with the character region compressed as a binary image and the background region compressed as a multi-level image. Moreover, a file size of a high-compression PDF is smaller than a file size of a normal PDF file.

Furthermore, a JPEG file having a "JPEG" file format includes image data compressed in accordance with a JPEG compression system (hereinafter referred to as "JPEG data"). In addition, an XPS file having an "XPS" file format and a PDF file having a "PDF" file format also include JPEG data.

Although a detailed description will be given later, compression rates of the JPEG data differ in correspondence with the three file sizes ("large", "medium", and "small"). The present embodiment defines the compression rate as follows. More specifically, the higher the compression rate, the smaller a data size (that is, the greater the degree of compression) of the JPEG data (that is, image data after compression). In other words, the lower the compression rate, the larger the data size (that is, the lower the degree of compression) of the JPEG data (that is, image data after compression). In a case where a relatively large file size is designated by the user, JPEG data compressed at a relatively low compression rate (that is, JPEG data having a relatively large data size) is created, and in a case where a relatively small file size is designated by the user, JPEG data compressed at a relatively high compression rate (that is, JPEG data having a relatively small data size) is created.

In a state where the aforementioned selection screen is displayed, the user operates the operation unit 12 to designate one setting value for each of the plurality of scan setting items. In this case, in S10 of FIG. 2, in accordance with the user selection (in other words, the user instruction), the controlling unit 30 selects one file size from among the three file sizes, selects one output resolution from among the five output resolutions, and selects one file format from among the eight file formats. In S10, the controlling unit 30 further causes the scan setting storage area 36 (refer to FIG. 1) to store the selected file size, the selected output resolution, and the selected file format.

Next, in S12, the optical resolution determination unit 50 (refer to FIG. 1) judges whether the selected output resolution stored in the scan setting storage area 36 is "Auto" or not, In a case where the selected output resolution is "Auto", the optical resolution determination unit 50 makes a judgment of YES in S12 and proceeds to S20. On the other hand, in a case where the selected output resolution is not "Auto" or, in other words, in a case where the selected output resolution is one of the four output resolutions having specific numerical values, the optical resolution determination unit 50 makes a judgment of NO in S12 and proceeds to S30.

(Determination of Optical Resolution: S20)

In S20, the optical resolution determination unit 50 refers to an optical resolution determination table 42 (refer to FIG. 3) included in the tables 40 in the memory 34 so as to determine an optical resolution. As shown in FIG. 3, the optical resolution determination table 42 is data representing a relationship among file sizes, file formats, and optical resolutions.

Data in the table 42 is set so that the relatively larger the file size (in other words, "large" or "medium"), the relatively higher the optical resolution (in other words, "600 dpi" corresponding to "JPEG"), and the relatively smaller the file size (in other words, "small"), the relatively lower the optical resolution (in other words, "300 dpi" corresponding to "JPEG"). Accordingly, the multi-function device 10 is capable of appropriately determining the optical resolution in accordance with the file size selected by the user.

In addition, the data in the table 42 is set so that in a case where the file size is "large" or "medium", the optical resolution corresponding to "JPEG" (in other words, "600 dpi") is higher than the optical resolution corresponding to "XPS" and "PDF" (in other words, "300 dpi"). "JPEG" is a file format not having a page concept (in other words, a file format incapable of including image data of a plurality of pages). In comparison, "PDF" and "XPS" are file formats having the page concept (in other words, file formats capable of including image data of a plurality of pages). Therefore, the data in the table 42 is set so that an optical resolution corresponding to the file formats having the page concept ("PDF" and "XPS") is lower than an optical resolution corresponding to the file format not having the page concept ("JPEG").

In a case where the file format having the page concept is selected, a scan of a document having a large number of pages may potentially be performed. In the present embodiment, since the relatively low optical resolution is determined when the file format having the page concept is selected, the file size can be prevented from becoming excessively large in a case where the scan of the document having the large number of pages is performed.

In S20, the optical resolution determination unit 50 determines an optical resolution by specifying the optical resolution corresponding to the selected file size and the selected file format stored in the scan setting storage area 36 from the optical resolution determination table 42. Accordingly, by utilizing the file size and the file format given from the user, the optical resolution determination unit 50 can appropriately determine an optical resolution to be utilized in the actual scan (hereinafter, referred to as a "determined optical resolution") from among the plurality of optical resolutions ("600 dpi" and "300 dpi").

In S22, the scan controlling unit 52 (refer to FIG. 1) causes the scan performing unit 20 to perform the color scan of the document. For example, in the case where the document is placed on the ADF mechanism 26, the document sensor 28 supplies a detection signal indicating that the document is placed on the ADF mechanism 26 to the controlling unit 30. In this case, in S22, the scan controlling unit 52 supplies the scan performing unit 20 with a signal for operating the ADF mechanism 26 and causes the ADF mechanism 26 to convey the document in the aforementioned second direction. Furthermore, the scan controlling unit 52 supplies the scan performing unit 20 with a signal for causing the plurality of optical elements 24 to perform the color scan in accordance with the determined optical resolution which had been determined in S20 (in other words, "600 dpi" or "300 dpi"). In doing so, the scan controlling unit 52 does not supply the scan performing unit 20 with a signal for moving the plurality of optical elements 24 in the second direction. Accordingly, the plurality of optical elements 24 in a stationary state performs the color scan of the document conveyed by the ADF mechanism 26 in accordance with the determined optical resolution which had been determined in S20. In other words, the ADF scan is performed.

In addition, for example, in the case where the document is placed on the transparent plate of the FB mechanism 22, the document sensor 28 does not supply the aforementioned detection signal to the controlling unit 30. In this case, in S22, the scan controlling unit 52 supplies the scan performing unit 20 with a signal for causing the plurality of optical elements 24 to perform the color scan in accordance with the determined optical resolution which had been determined in S20, and a signal for moving the plurality of optical elements 24 in the second direction. Accordingly, the plurality of optical elements 24 in a moving state performs the color scan of the document placed on the transparent plate in accordance with the determined optical resolution which had been determined in S20. In other words, the FB scan is performed. By performing S22, the scan controlling unit 52 can obtain scan data (in other words, color image data) indicating the determined optical resolution determined which had been determined in S20 from the scan performing unit 20.

Next, in S24, the analysis performing unit 54 (refer to FIG. 1) performs an analysis of the scan data and the output resolution determination unit 60 (refer to FIG. 1) determines an output resolution (hereinafter referred to as a "determined output resolution") by utilizing a result of the analysis. Contents of the analysis process performed in S24 will be described in detail later.

Next, in S26, the conversion unit 62 and the creation unit 64 (refer to FIG. 1) create an object file including image data indicating the determined output resolution. In S26, first, the conversion unit 62 judges whether or not the determined optical resolution that had been determined in S20 and the determined output resolution that had been determined in S24 are identical to each other.

In a case where the determined optical resolution and the determined output resolution are not identical to each other, the conversion unit 62 resizes (in other words, converts) the scan data indicating the determined optical resolution (for example, "600 dpi") into scan data indicating the determined output resolution (for example, "300 dpi"). While a bilinear method is adopted as a resizing method in the present embodiment, other methods may be adopted in a modification.

On the other hand, in a case where the determined optical resolution and the determined output resolution are identical to each other, the conversion unit 62 does not resize (convert) the scan data. In other words, in this case, the scan data indicating the determined optical resolution becomes equal to the image data indicating the determined output resolution.

Next, the creation unit 64 compresses the image data indicating the determined output resolution in correspondence with the selected file size stored in the scan setting storage area 36. Moreover, the creation unit 64 compresses the image data by utilizing the JPEG compression system. The creation unit 64 compresses the image data at a first compression rate in a case where the selected file size is "large", compresses the image data at a second compression rate that is higher than the first compression rate in a case where the selected file size is "medium", and compresses the image data at a third compression rate that is higher than the second compression rate in a ease where the selected file size is "small". Accordingly, JPEG data is created.

The creation unit 64 further creates data corresponding to the selected file format stored in the scan setting storage area 36. For example, in a case where the selected file format is JPEG, the creation unit 64 creates a file name including the JPEG extension (".jpg"), a JPEG header and a JPEG footer, and the like. Accordingly, an object file having a JPEG file format is completed.

In addition, for example, in a case where the selected file format is XPS, the creation unit 64 creates a file name including the XPS extension (".xps"), a JPEG header and a JPEG footer, an XPS header and an XPS footer, data indicating a page number, and the like. Accordingly, an object file having an XPS file format is completed.

Furthermore, for example, in a case where the selected file format is one of the six PDF types shown in FIG. 1, the creation unit 64 creates a file name including the PDF extension (".pdf"), a JPEG header and a JPEG footer, a PDF header and a PDF footer, data indicating a page number, and the like. In addition, the creation unit 64 creates data in correspondence with the PDF type (PDF/A, Encryption PDF, Signature Enclosed PDF, and the like) by utilizing a known method. For example, in case of Signature Enclosed PDF, the creation unit 64 encloses an digital signature in the object file. Accordingly, an object file having a PDF file format is completed.

Moreover, as described earlier, JPEG is a file format not having the page concept. Therefore, for example, in a case where a scan of a document including two or more pages is performed, a JPEG object file representing a single-page document is created for each document page. In other words, in a case where the selected file format is JPEG and a scan of a document including Y-number of pages (where Y is an integer equal to or greater than 2) is performed, the creation unit 64 creates Y-number of JPEG object files respectively having different file names.

On the other hand, PDF and XPS are file formats having a page concept. Therefore, in a case where the selected file format is PDF or XPS and a scan of a document including Y-number of pages (where Y is an integer equal to or greater than 2) is performed, the creation unit 64 creates a single object file (in other words, a PDF file or an XPS file) including the JPEG data corresponding to Y-number pages representing the document including the Y-number of pages. Once S26 is concluded, a transfer is made to S40.

On the other hand, in S30, the optical resolution determination unit 50 determines an optical resolution corresponding to the selected output resolution stored in the scan setting storage area 36. In S30, a relationship between output resolutions and optical resolutions has been determined in advance. More specifically, in a case where the selected output resolution is "600 dpi", the optical resolution determination unit 50 determines "600 dpi" as the optical resolution. In addition, in a case where the selected output resolution is any of "300 dpi", "200 dpi", and "100 dpi", the optical resolution determination unit 50 determines "300 dpi" as the optical resolution.

Next, in S32, the scan controlling unit 52 causes the scan performing unit 20 to perform a scan in accordance with the determined optical resolution which had been determined in S30 in the same manner as in S22. Next, in S34, the conversion unit 62 and the creation unit 64 convert the scan data so as to create an object file in the same manner as in S26. Once S34 is concluded, a transfer is made to S40.

In S40, the controlling unit 30 transmits the object file created in S26 or S34 to a destination (for example, a USB memory, the PC 80, a predetermined server, or the like) selected in advance by the user. Accordingly, the user can cause an image represented by the JPEG data included in the object file (in other words, an image representing the document that is the scan object) to be outputted (displayed, printed, or the like). Once S40 is concluded, the scan process is concluded.

Figure 4:
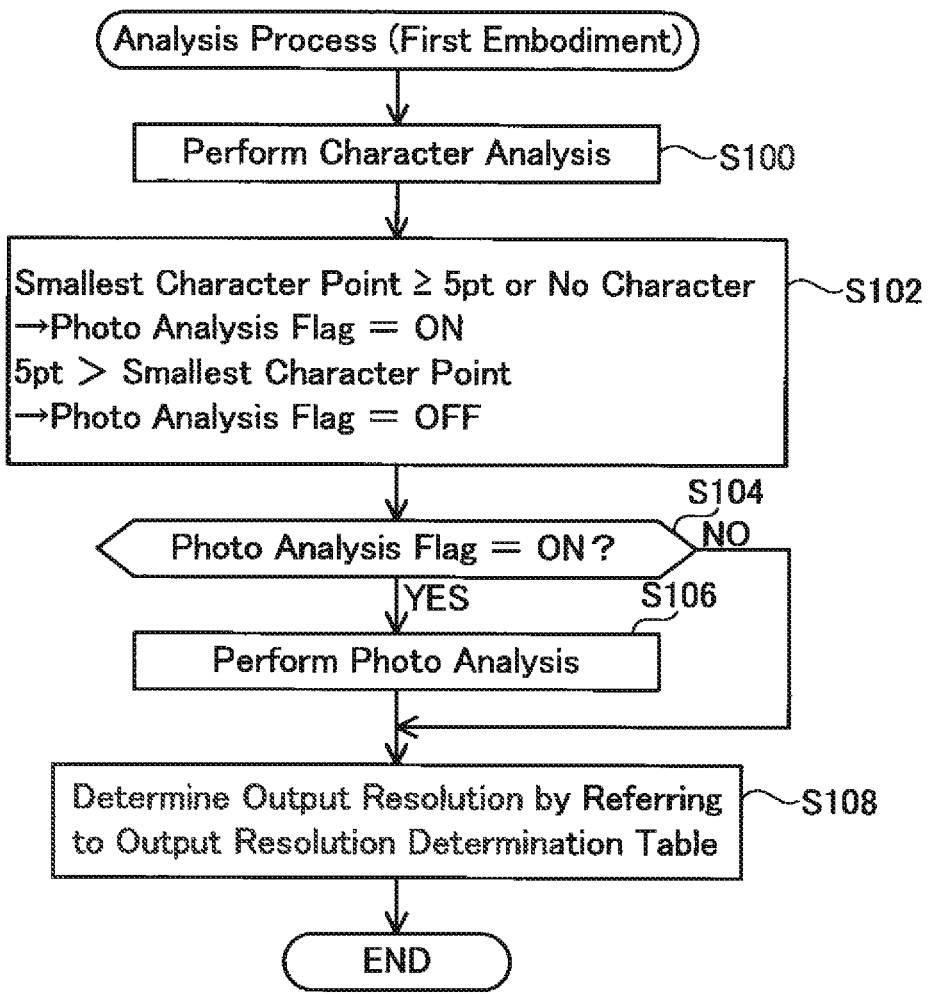
FIG. 4 shows a flow chart of an analysis process.

(Analysis Process: FIG. 4)

Contents of the analysis process performed in S24 of FIG. 2 will now be described in detail. As shown in FIG. 4, in S100, the analysis performing unit 54 performs a character analysis of the scan data. More specifically, in S100, the second analysis unit 58 (refer to FIG. 1) performs a character analysis of scan data to calculate a size of the smallest character included in the document (hereinafter referred to as the "smallest character point") as an index value indicating a configuration of the character included in the document.

(Character Analysis of S100: FIG. 5)

Contents of the character analysis of S100 in FIG. 4 will be described. FIG. 5 shows an example of a scan image 100 represented by the scan data obtained by the scan of the document performed in S22 in FIG. 2. In the present embodiment, the document includes alphabetical characters "A" to "Y" and a natural image in which a flower is present in a blue background. Moreover, the characters "A" to "Y" are in black and the surroundings of the characters "A" to "Y" (in other words, a background of the document) are in white. In addition, "A" to "C" have relatively large character sizes and "D" to "Y" have relatively small character sizes.

Moreover, each of the plurality of pixels constituting the scan data has an RGB pixel value. In S100, the second analysis unit 58 first calculates a value related to a luminance of a pixel for each of the plurality of pixels constituting the scan data. In the present embodiment, a Y value that is utilized in a YCC color space is used as the value related to luminance. More specifically, the second analysis unit 58 calculates a Y value of each pixel by utilizing a mathematical formula expressed as $Y=0.299 \times R+0.587 \times G+0.114 \times B$. Moreover, in a modification, for example, a V value that is utilized in an HSV color space or a value related to luminance in another color space may be utilized as the value related to luminance.

Moreover, an alignment of the respective pixels along the aforementioned first direction (the direction in which the plurality of optical elements 24 are aligned) will be referred to as a "row", and an alignment of the respective pixels along the aforementioned second direction (the direction perpendicular to the first direction) will be referred to as a "column". The second analysis unit 58 calculates Yrsum1 that is a sum of Y values of the respective pixels constituting the pixels of a first row. In a similar manner, the second analysis unit 58 also calculates Yrsum2 and the like for the pixels of the second and subsequent rows. Accordingly, M-number (where M is an integer equal to or larger than 2) of Yrsums (Yrsum1 to YrsumM) corresponding to pixels of M-number of rows which constitute the scan data are calculated.

Next, as shown in the lower diagram of FIG. 5, the second analysis unit 58 creates a histogram of the M-number of Yrsums. For example, the pixels of the first row are pixels representing only the white background of the document. Therefore, since the luminance of the pixels of the first row is high, Yrsum1 of the pixels of the first row has a relatively large value. On the other hand, the pixels of the second row are pixels representing a portion of the black characters "A" to "C". Therefore, since the luminance of the pixels of the second row is lower than the luminance of the pixels of the first row which represent only the white background, Yrsum2 of the pixels of the second row has a relatively small value. In a similar manner, Yrsum of the pixels representing the characters "D" to "N" has a relatively small value, and Yrsum of the pixels representing the characters "O" to "Y" also has a relatively small value. Furthermore, Yrsum of the pixels representing the natural image including a blue background also has a relatively small value.

As is apparent from the histogram shown in FIG. 5, the Yrsum of the pixels representing only the background and the Yrsum of the pixels representing the characters "A" to "Y" significantly differ from each other. Therefore, a number of consecutive rows which have a relatively small Yrsum corresponds to a size of single character along the second direction. The second analysis unit 58 identifies a number of consecutive rows (hereinafter referred to as "consecutive row numbers") which have a Yrsum equal to or smaller than a predetermined value. Specifically, the second analysis unit 58 identifies consecutive row numbers corresponding to an arrow A1 representing the characters "A" to "C", consecutive row numbers corresponding to an arrow A2 representing the characters "D" to "N", and consecutive row numbers corresponding to an arrow A3 representing the characters "O" to "Y". Furthermore, since the Ycsum of the pixels representing the natural image is also a relatively small value, the second analysis unit 58 identifies consecutive row numbers corresponding to an arrow A4 despite the natural image not including any characters.

Next, the second analysis unit 58 identifies smallest consecutive row numbers from the four consecutive row numbers corresponding to the arrows A1 to A4. In the present embodiment, since the consecutive row numbers corresponding to the arrow A2(=the consecutive row numbers corresponding to the arrow A3) is the smallest, the second analysis unit 58 identifies the consecutive row numbers corresponding to the arrow A2. Since the second analysis unit 58 is already aware of unit information for converting a single row into a character size (in other words, unit information indicating how many points a single row corresponds to), the second analysis unit 58 is capable of calculating a size of the smallest character (for example, "D") included in the document (in other words, the smallest character point) by multiplying the consecutive row numbers corresponding to the arrow A2 with the unit information.

Furthermore, in the same manner as the analysis along the row direction, the second analysis unit 58 also performs an analysis along the column direction (in other words, calculations of Ycsum1 to YcsumN which are sums of Y values of the respective pixels, identification of the number of pixels (that is, consecutive column numbers) having the Ycsum equal to or smaller than a predetermined value, and the like). However, in the example of the scan image 100 shown in FIG. 5, a major portion of pixels of the N-number of columns (where N is an integer equal to or greater than 2) constituting scan data represents the natural image. Therefore, the consecutive column numbers become a significantly large value. As shown, in a case where the consecutive column numbers assume a significantly large value (in other words, in a case where the consecutive column numbers exceed a predetermined threshold), the second analysis unit 58 judges in an analysis along the column direction that a character is not included in the document. However, as described above, since the smallest character point in an analysis along the row direction is calculated, the second analysis unit 58 adopts the smallest character point as a result of the character analysis of S100.

Moreover, in a modification, for example, in a case where the character analysis of scan data representing a document only including a natural image is performed, the consecutive row numbers become a significantly large value, and the consecutive column numbers may also become a significantly large value. In such a case, the second analysis unit 58 judges that a character is not included in the document in both the analysis along the row direction and the analysis along the column direction. In this case, the second analysis unit 58 judges that a character is not included in the document as a result of the character analysis in S100. Moreover, in another modification, the smallest character point may be calculated in the analysis along the row direction and the smallest character point may also be calculated in the analysis along the column direction. In this case, the second analysis unit 58 adopts whichever is the smaller among the two smallest character points as the result of the character analysis in S100.

After the character analysis of S100 in FIG. 4 is concluded, in S102, the judging unit 66 (refer to FIG. 1) judges whether a photo analysis in S106 is to be performed by the first analysis unit 56 (refer to FIG. 1) or not by utilizing the smallest character point obtained in the character analysis in S100.

More specifically, the judging unit 66 judges that the photo analysis in S106 is not to be performed in a case where the smallest character point is relatively small (in a case where 5 pt> smallest character point). Supposing that a relatively low output resolution is adopted in a case where the smallest character point is relatively small, the user is more likely to recognize that image quality is low. Therefore, in the case where the smallest character point is relatively small, since it is obvious that a relatively high output resolution must be adopted even without performing the photo analysis, in S102, the judging unit 66 judges that the photo analysis is not to be performed.

On the other hand, while a relatively low output resolution may be adopted in a case where the smallest character point is relatively large (in a case where smallest character point ≤5 pt), the photo analysis must be further performed to judge whether such an output resolution is appropriate or not. Therefore, in the case where the smallest character point is relatively large, in S102, the judging unit 66 judges that the photo analysis is to be performed. Moreover, in the case where it is judged that a character is not included in the document, the result of the character analysis alone is insufficient to appropriately determine the output resolution. Therefore, in the case where it is judged that a character is not included in the document, in S102, the judging unit 66 judges that the photo analysis is to be performed.

In the case where the judging unit 66 judges in S102 that the photo analysis is to be performed, the judging unit 66 sets ON as a photo analysis flag (not shown) in the memory 34, and in the case where it is judged that the photo analysis is not to be performed, the judging unit 66 sets OFF as the photo analysis flag.

Next, in S104, the judging unit 66 judges whether ON has been set as the photo analysis flag or not. In the case where ON has been set as the photo analysis flag (in the case of YES in S104), in S106, the analysis performing unit 54 performs the photo analysis of the scan data. More specifically, in S106, the first analysis unit 56 performs the photo analysis of the scan data to calculate an edge rate ER (refer to FIG. 6) that indicates a fineness of the document as the index value for classifying a document including a natural image. Moreover, in the case where OFF has been set as the photo analysis flag (in the case of NO in S104), since the photo analysis in S106 is skipped, the first analysis unit 56 does not calculate the edge rate ER. In this case, processing load can be reduced.

Figure 6:
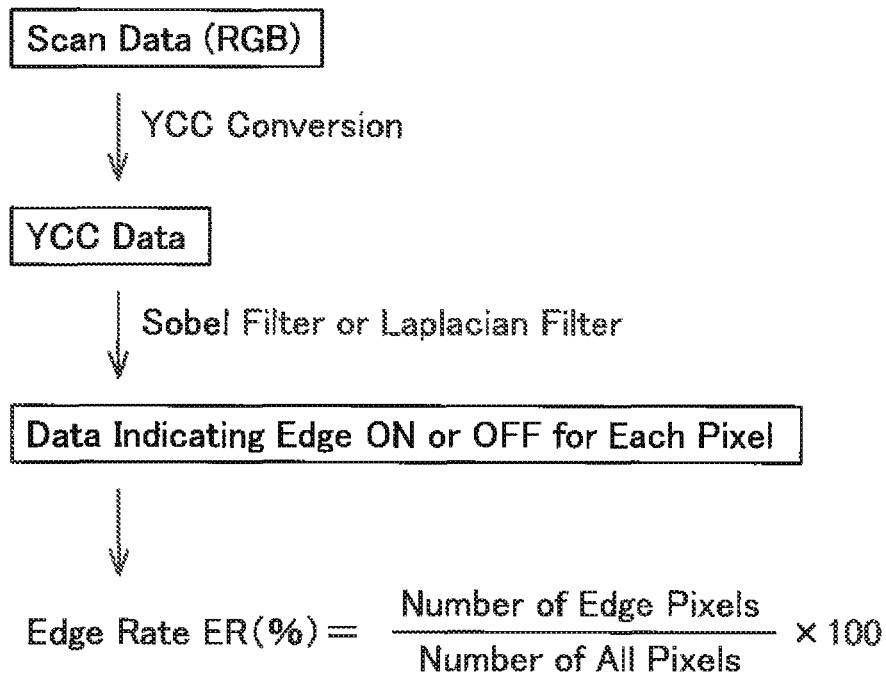
FIG. 6 shows a diagram for explaining contents of a photo analysis.

(Photo Analysis of S106: FIG. 6)

Contents of the photo analysis of S106 in FIG. 4 will be described. For each of the plurality of pixels that constitute the scan data, the first analysis unit 56 determines whether the pixel is an edge pixel or a non-edge pixel, and calculates the edge rate ER that is a proportion of the edge pixels among the scan data. Moreover, an edge refers to a portion whose brightness (luminance) changes significantly in the image. Therefore, the edge pixel is a pixel having a luminance value that significantly differs from surrounding pixels. Since discrimination methods of the edge pixels and non-edge pixels are well known, contents of the photo analysis will be briefly described herein.

As shown in FIG. 6, in S106, the first analysis unit 56 first creates the YCC data by converting each of the plurality of pixels constituting the scan data (pixels represented by the RGE values) into a pixel in the YCC color space. Moreover, a known mathematical formula is utilized for the conversion from RGB to YCC.

Next, the first analysis unit 56 applies a known filter for discriminating edge pixels from non-edge pixels (for example, a Sobel filter or a Laplacian filter) to the YCC data. Accordingly, for each of the plurality of pixels, the first analysis unit 56 can determine whether the pixel is the edge pixel (edge ON) or the non-edge pixel (edge OFF).

Next, the first analysis unit 56 divides the number of pixels determined as the edge ON (in other words, the number of the edge pixels) by the total number of pixels constituting the YCC data (in other words, the total number of pixels constituting the scan data). The first analysis unit 56 then multiplies the value obtained by the division by 100 to calculate the edge rate ER (%).

For example, a natural image with a relatively small amount of variation in brightness such as an ordinary scenery image (for example, mountains, sea, or the like) has a low edge rate ER. In other words, the natural image having a relatively low fineness has the low edge rate ER. On the other hand, a natural image with a relatively large amount of variation in brightness such as a natural image including a building or a natural image including a plurality of people has a high edge rate ER. In other words, the natural image having a relatively high fineness has the high edge rate ER. Therefore, the edge rate ER is an index value indicating the fineness of the document.

Moreover, in the present embodiment, as shown in FIG. 7 (to be described later), a document is classified into any of three fineness stages (high fineness, medium fineness, and low fineness) in correspondence with the edge rate ER. For example, the document representing the scan image 100 shown in FIG. 5 includes a natural image with a relatively low fineness. However, the document representing the scan image 100 also includes a plurality of characters. Since a boundary between the character and the background has a large amount of variation in brightness, the number of edge pixels increases if a character is included. Therefore, for example, the document representing the scan image 100 may be classified in the medium fineness. Once the photo analysis of S106 in FIG. 4 is concluded, a transfer is made to S108.

(Determination of Output Resolution: S108)

In S108, the output resolution determination unit 60 (refer to FIG. 1) determines the output resolution based on the result of the character analysis of S100 and the result of the photo analysis of S106 (in the case where S106 is performed). In the case where the photo analysis of S106 is performed, the output resolution determination unit 60 determines the output resolution by utilizing the smallest character point obtained in the character analysis of S100 and the edge rate ER obtained in the photo analysis of S106. On the other hand, in the case where the photo analysis of S106 is not performed, the output resolution determination unit 60 determines the output resolution by utilizing only the smallest character point obtained in the character analysis of S100 (in other words, not utilizing the edge rate ER).

More specifically, in S108, the optical resolution determination unit 60 refers to an output resolution determination table 44a (refer to FIG. 7) included in the tables 40 in the memory 34 so as to determine the output resolution. As shown in FIG. 7, the output resolution determination table 44a is data representing a relationship among the smallest character points, the edge rates ER, and the output resolutions. Moreover, in the case where the determined optical resolution (the optical resolution determined in S20 in FIG. 2) is 300 dpi, the upper table in FIG. 7 is used, and in the case where the determined optical resolution is 600 dpi, the lower table in FIG. 7 is used. As described earlier, in the case where the smallest character point <5 pt, the photo analysis is not performed. Therefore, in the output resolution determination table 44a, a field of the photo analysis result corresponding to the smallest character point <5 pt remains blank.

Data in the table 44a is set so that the relatively smaller the smallest character point, the relatively higher the output resolution, and the relatively larger the smallest character point, the relatively lower the output resolution. For example, in the case where the smallest character point <5 pt in the table corresponding to determined optical resolution=300 dpi, the same value (for example, 300 dpi) as the determined optical resolution is set as the output resolution. In addition, for example, in the case where 10.5 pt< the smallest character point, a smaller value (for example, 100 dpi representing low fineness) than the same value as the determined optical resolution is set as the output resolution.

In a case where the smallest character point is relatively small, if the output resolution were low, the user is more likely to recognize that the image quality is low. Therefore, in the case where the smallest character point is relatively small, a relatively high output resolution is set so that the user does not receive a sense of low image quality. Moreover, in the present embodiment, data in the table 44a is set so that output resolution does not assume a larger value than a value that is identical to the determined optical resolution in order to avoid having to perform an interpolation process of the image data. Therefore, in the case where the smallest character point <5 pt, the same value as the determined optical resolution is set as the output resolution. Consequently, an extremely high output resolution can be adopted in the case where the smallest character point <5 pt so that the user can be prevented from receiving the sense of low image quality. On the other hand, in the case where the smallest character point is relatively large, even if the output resolution is low, the user is less likely to recognize that image quality is low. Therefore, in the case where the smallest character point is relatively large, a relatively low output resolution is set so that the data size of the object file does not become excessively large.

Moreover, in the table 44a, no character is classified in a same category as 10.5 pt< smallest character point. Therefore, in the case where the result of the character analysis is no character, an appropriate output resolution in correspondence with the result of the photo analysis (in other words, the fineness of the document) is determined.

In addition, the data in the table 44a is set so that the relatively higher the edge rate ER, the relatively higher the output resolution, and the relatively lower the edge rate ER, the relatively lower the output resolution. For example, in the case of the high fineness corresponding to the edge rate ER >2.8 in a table corresponding to determined optical resolution=300 dpi, the same value (for example, 300 dpi) as the determined optical resolution is set as the output resolution. In addition, for example, in the case of the medium fineness corresponding to $1.0 \leq$ the edge rate ER $\leq 2.8$, a smaller value (for example, 200 dpi) than the same value as the determined optical resolution is set as the output resolution.

In the case where the document has a relatively high fineness, if the output resolution were low, the user is more likely to recognize that the image quality is low. Therefore, in the case where the document has the relatively high fineness, a relatively high output resolution is set so that the user does not receive the sense of low image quality. In particular, in a case where the edge rate ER>2.8 (in other words, in a case of high fineness), the same value (for example, 300 dpi) as the determined optical resolution is set as the output resolution. Consequently, an extremely high output resolution can be adopted in the case where the edge rate ER>2.8 so that the user can be prevented from receiving the sense of low image quality. On the other hand, in the case where the document has a relatively low fineness, even if the output resolution is low, the user is less likely to recognize that the image quality is low. Therefore, in the case where the document has the relatively low fineness, a relatively low output resolution is set so that the data size of the object file does not become excessively large.

Moreover, the data in the table 44a is set so that even if the smallest character point is the same, output resolutions differ in a case where the fineness differs. For example, with the table corresponding to determined optical resolution=300 dpi, in the case where 5 pt$\leq$ the smallest character point $\leq 10.5$ pt, the output resolution corresponding to the high fineness (300 dpi) and the output resolution corresponding to the medium fineness (200 dpi) differ from each other. According to this configuration, the multi-function device 10 is capable of appropriately determining the output resolution in accordance with the fineness of the document in the case where the smallest character point is the same.

Moreover, the data in the table 44a is set so that even if the fineness is the same, output resolutions differ in a case where the smallest character point differs. For example, with the table corresponding to the determined optical resolution=300 dpi, in the case of the low fineness, the output resolution corresponding to 5 pt$\leq$ the smallest character point $\leq 10.5$ pt (200 dpi) and the output resolution corresponding to 10.5 pt$\leq$ the smallest character point (100 dpi) differ from each other. According to this configuration, the multi-function device 10 is capable of appropriately determining the output resolution in accordance with the smallest character point in a case where the fineness of the document is the same.

In S108, the output resolution determination unit 60 determines the output resolution by identifying the output resolution corresponding to the determined optical resolution, the smallest character point, and the edge rate ER from the output resolution determination table 44a. Accordingly, the output resolution determination unit 60 is capable of appropriately determining the output resolution. Once S108 is concluded, the analysis process is concluded. As described earlier, in S26 of FIG. 2, the object file including the image data indicating the output resolution determined in S108 is created. Therefore, the user is able to utilize the object file including the image data indicating an appropriate output resolution (for example, output the image).

(Advantageous Effect of Present Embodiment)

According to the present embodiment, the multi-function device 10 is capable of appropriately determining the optical resolution to be utilized in the actual scan by utilizing the file size and the file format given from the user. In other words, as shown in FIG. 3, while the optical resolution of 600 dpi that is the highest value may be determined, the optical resolution of 300 dpi may also be determined. When the relatively low optical resolution of 300 dpi is determined, the scan of the document can be performed at a relatively high speed, and the difference between the optical resolution and the output resolution can be prevented from becoming large. Supposing that the difference between the optical resolution and the output resolution increases, a longer time is required for the process (in other words, the resize process) for converting the scan data indicating the optical resolution into the image data indicating the output resolution. In the present embodiment, since the optical resolution of 300 dpi may be determined, the processing load may be reduced, and the period of time between the scan of the document and the creation of the object file may be shortened.

In addition, in the present embodiment, the multi-function device 10 is capable of appropriately determining the output resolution based on the result of the analysis of the scan data. Therefore, the multi-function device 10 is capable of appropriately determining both the optical resolution and the output resolution.

In particular, the multi-function device 10 determines the output resolution by utilizing the edge rate ER for classifying the document including the natural image or, in other words, by utilizing the edge rate ER for classifying the document from the perspective of fineness. Therefore, the multi-function device 10 is capable of appropriately determining the output resolution for the scan data representing the document including the natural image.

(Correspondence Relationship)

The multi-function device 10 is an example of an "image processing device". The optical resolution determined in S20 of FIG. 2 is an example of a "specific optical resolution". The edge rate ER and the smallest character point are, respectively, examples of a "first type of index value" and a "second type of index value". Moreover, in the table corresponding to the optical resolution=300 dpi shown in FIG. 7, 300 dpi corresponding to the high fineness and 200 dpi corresponding to the medium fineness in a case where 5 pt≤ the smallest character point <10.5 pt are, respectively, examples of a "first value" and a "second value". In addition, the low fineness is an example of a "first fineness", and 10.5 pt< the smallest character point and 5 pt≤ the smallest character point <10.5 pt are, respectively, examples of a "first configuration" and a "second configuration". In this example, in the table corresponding to the optical resolution=300 dpi in FIG. 7, 100 dpi and 200 dpi are, respectively, examples of a "third value" and a "fourth value". In addition, the low fineness and the medium fineness are examples of a "first fineness" and a "second fineness", and 10.5 pt< the smallest character point is an example of a "first configuration". In this example, in the table corresponding to the optical resolution=300 dpi in FIG. 7, 100 dpi and 200 dpi are, respectively, examples of a "third value" and a "fifth value".

(Second Embodiment)

Figure 8:
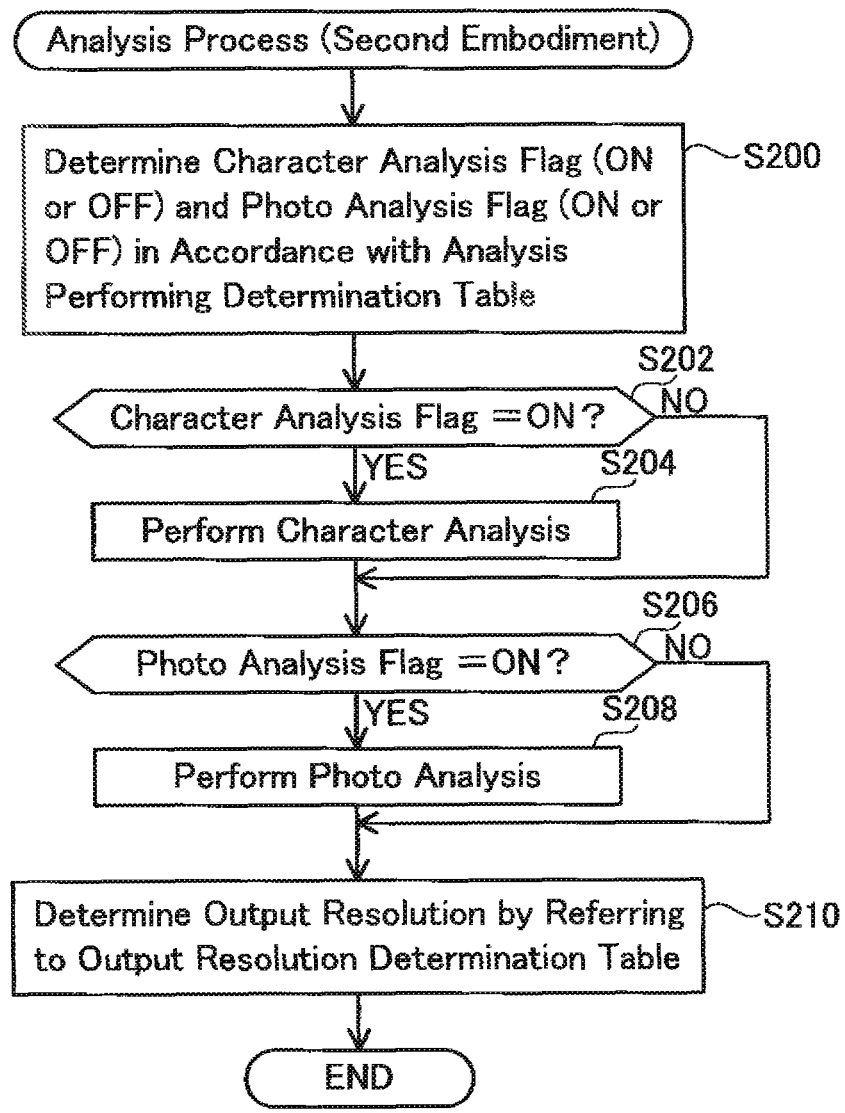
FIG. 8 shows an example of an analysis process according to a second embodiment.

In the present embodiment, in S24 of FIG. 2, an analysis process of FIG. 8 is performed in place of the analysis process of FIG. 4. In S200, for each of a character analysis and a photo analysis, the judging unit 66 judges whether the analysis is to be performed or not based on a combination of which of an ADF scan or an FB scan is performed and the selected file format stored in the scan setting storage area 36.

More specifically, in S200, the judging unit 66 refers to an analysis performing determination table 46 (refer to FIG. 9) included in the tables 40 in the memory 34 so as to determine whether each of the character analysis and the photo analysis is to be performed or not. As shown in FIG. 9, the analysis performing determination table 46 is data representing a relationship among a document setting position (in other words, the ADF scan or the FB scan), a selected file format, whether the character analysis is to be performed or not (ON or OFF), and whether the photo analysis is to be performed or not (ON or OFF). Moreover, while a remarks column is provided in FIG. 9 to facilitate technical understanding, the actual data does not include the remarks column.

(ADF/FB)

Normally, a user is likely to desire performing the ADF scan on a document including a character and is likely to desire performing the FB scan on a photograph or the like that represents a natural image. Therefore, in the case where the user desires to perform the ADF scan, the document is likely to include a character. To this end, in the case where the ADF scan is to be performed, the character analysis for calculating the smallest character point that is an index value indicating a configuration of the character included in the document is favorably performed. On the other hand, in the case where the user desires to perform the FB scan, the document is likely to include a natural image. Therefore, in the case where the FB scan is to be performed, the photo analysis for calculating an edge rate ER that is an index value for classifying a document including a natural image is favorably performed.

(JPEG)

In particular, in a case where the user desires to perform the FB scan by selecting JPEG that is a file format not having a page concept, it is likely that the document does not include a character (in other words, the document is likely to be a photograph or the like that only includes the natural image). In consideration thereof, as indicated by (Note 1) and (Note 2), data in the table 46 is set so that, in a case where the selected file format is JPEG, the character analysis is preformed (character analysis=ON) when the ADF scan is performed, the character analysis is not performed (character analysis=OFF) when the FB scan is performed. According to this configuration, the multi-function device 10 is capable of appropriately determining the output resolution by utilizing the result of the character analysis in the case where the ADF scan is performed. On the other hand, since the multi-function device 10 does not perform the character analysis in the case where the FB scan is performed, the multi-function device 10 is capable of reducing the processing load.

Moreover, in a case where the document includes a natural image, the user is likely to select JPEG that is a file format not having the page concept instead of selecting XPS or PDF. Therefore, the data in the table 46 is set so that the photo analysis is performed regardless of which of the ADF scan and the FB scan is performed in the case where the selected file format is JPEG.

(XPS, PDF)

In addition, in a case where the user desires to perform the ADF scan while selecting XPS or PDF that is a file format having the page concept, it is likely that the document does not include a natural image (in other words, the document is likely to be a text that only includes characters). In consideration thereof, as indicated by (Note 3) and (Note 4), the data in the table 46 is set so that, in the case where the selected file format is XPS or PDF, the photo analysis is performed (photo analysis=ON) when the FB scan is performed, the photo analysis is not performed (photo analysis=OFF) when the ADF scan is performed. According to this configuration, the multi-function device 10 is capable of appropriately determining the output resolution by utilizing the result of the photo analysis in the case where the FB scan is performed, On the other hand, since the multi-function device 10 does not perform the photo analysis in the case where the ADF scan is performed, the multi-function device 10 is capable of reducing processing load.

Moreover, in the case where the document includes a character, the user is likely to select XPS or PDF that is the file format having the page concept instead of selecting JPEG. Therefore, the data in the table 46 is set so that the character analysis is performed regardless of which of the ADF scan and the FB scan is performed in the case where the selected file format is XPS or PDF.

(PDF/A)

In the case where the user selects PDF/A, it is likely that the user desires to save image data on a long-term basis. In other words, in a case where PDF/A is selected, it is likely that the document that is important to the user is to be scanned. Therefore, in the case where the selected file format is PDF/A, a high output resolution having the same value as the optical resolution is favorably determined even without performing the character analysis and the photo analysis. In consideration thereof, as indicated by (Note 5), the data in the table 46 is set so that in the case where the selected file format is PDF/A, neither the character analysis nor the photo analysis is performed. According to this configuration, since the multi-function device 10 performs neither the character analysis nor the photo analysis in the case where PDF/A is selected, the multi-function device 10 is capable of reducing the processing load.

(Signature Enclosed PDF)

For example, rules of specific Japanese ministries recommend that a high resolution equal to or higher than 300 dpi be set for Signature Enclosed PDF. Therefore, in a case where the selected file format is Signature Enclosed PDF, a high output resolution equal to or higher than 300 dpi is favorably determined even without performing the character analysis and the photo analysis. In the present embodiment, in the case where the selected file format is Signature Enclosed PDF, a high output resolution having the same value as the optical resolution is determined. Moreover, in a modification, in the case where the selected file format is Signature Enclosed PDF, a smaller value than the value that is identical to the optical resolution (however, a value equal to or greater than 300 dpi) may be determined as the output resolution. In consideration thereof, as indicated by (Note 6), the data in the table 46 is set so that in the case where the selected file format is Signature Enclosed PDF, neither the character analysis nor the photo analysis is performed. According to this configuration, since the multi-function device 10 performs neither the character analysis nor the photo analysis in the case where Signature Enclosed PDF is selected, the multi-function device 10 is capable of reducing the processing load.

(Other File Formats)

Moreover, in a case where Encryption PDF or Searchable PDF is selected, it is likely that the document includes a character and does not include a natural image. Therefore, the data in the table 46 is set so that the character analysis is performed but the photo analysis is not performed regardless of which of the ADF scan and the FB scan is performed in the case where the selected file format is Encryption PDF or Searchable PDF.

In addition, regardless of the document type, in a case where the user desires to reduce data size of the object file, high-compression PDF can be selected. Therefore, in the case where high-compression PDF is selected, the document may include a character and may also include a natural image. As such, the data in the table 46 is set so that both the character analysis and the photo analysis are performed regardless of which of the ADF scan and the FB scan is performed in the case where the selected file format is high-compression PDF.

In S200, the judging unit 66 judges whether the character analysis is to be performed or not and whether the photo analysis is to be performed or not by identifying a type of scan (ADF scan or FB scan) and information corresponding to the selected file format (character analysis=ON/OFF, photo analysis=ON/OFF) from the analysis performing determination table 46. In S200, in correspondence with the result of the judgment on whether the character analysis is to be performed or not, the judging unit 66 sets ON or OFF as a character analysis flag (not shown) in the memory 34. In a similar manner, in correspondence with the result of the judgment on whether the photo analysis is to be performed or not, the judging unit 66 sets ON or OFF as a photo analysis flag (not shown) in the memory 34.

Next, in S202, the judging unit 66 judges whether ON has been set as the character analysis flag or not. In a case where ON has been set as the character analysis flag (in the case of YES in S202), in S204, the second analysis unit 58 performs the character analysis of the scan data Contents of the character analysis are similar to those in the first embodiment. Moreover, in a case where OFF has been set as the character analysis flag (in the case of NO in S202), since the character analysis in S204 is skipped, the processing load can be reduced.

Next, in S206, the judging unit 66 judges whether ON has been set as the photo analysis flag or not. In a case where ON has been set as the photo analysis flag (in the case of YES in S206), in S208, the first analysis unit 56 performs the photo analysis of the scan data. Contents of the photo analysis are similar to those in the first embodiment. Moreover, in a case where OFF has been set as the photo analysis flag (in the case of NO in S206), since the photo analysis in S208 is skipped, the processing load can be reduced.

Next, in S210, the output resolution determination unit 60 determines the output resolution. In the case where both the character analysis in S204 and the photo analysis in S206 have been performed, the output resolution determination unit 60 determines the output resolution by referring to the table 44a shown in FIG. 7 and utilizing both the result of the character analysis (in other words, the smallest character point) and the result of the photo analysis (in other words, the edge rate ER). In the case where only the character analysis in S204 is performed, the output resolution determination unit 60 determines the output resolution by referring to the table 44b shown in FIG. 10 and utilizing the result of the character analysis without utilizing the result of the photo analysis. In the case where only the photo analysis in S208 is performed, the output resolution determination unit 60 determines the output resolution by referring to the table 44b shown in FIG. 10 and utilizing the result of the photo analysis without utilizing the result of the character analysis.

Moreover, in the same manner as the data in the table 44a shown in FIG. 7, the data in the table 44b shown in FIG. 10 is set so that the relatively smaller the smallest character point, the relatively higher the output resolution, and the relatively larger the smallest character point, the relatively lower the output resolution. Furthermore, in the table 44b, no character is classified in a same category as 10.5 pt< the smallest character point. In addition, the data in the table 44b is set so that the relatively higher the edge rate ER, the relatively higher the output resolution, and the relatively lower the edge rate ER, the relatively lower the output resolution.

Furthermore, as described earlier, neither the character analysis nor the photo analysis is performed in the case where the selected file format is PDF/A or Signature Enclosed PDF (refer to (Note 5) and (Note 6) in FIG. 9). In this case, the output resolution determination unit 60 determines the output resolution by utilizing neither the result of the character analysis nor the result of the photo analysis. In other words, the output resolution determination unit 60 determines a value that is identical to the optical resolution as the output resolution in the case where the selected file format is PDF/A or Signature Enclosed PDF. According to this configuration, the multi-function device 10 is capable of appropriately determining the output resolution in the case where PDF/A or Signature Enclosed PDF is selected.

(Advantageous Effect of Second Embodiment)

In the present embodiment, in the same manner as in the first embodiment, the multi-function device 10 is capable of appropriately determining the optical resolution to be utilized in the actual scan by utilizing the file size and the file format given from the user (S20 in FIG. 2), and is also capable of appropriately determining the output resolution based on the result of the analysis of the scan data (the analysis processes in FIG. 9). Therefore, the multi-function device 10 is capable of appropriately determining both the optical resolution and the output resolution. In addition, the multi-function device 10 is capable of appropriately determining the output resolution for the scan data representing the document including the natural image.

In particular, the multi-function device 10 is capable of appropriately judging whether each of the character analysis and the photo analysis is to be performed or not based on which of the ADF scan and the FB scan is to be performed and based on which file format is to be selected. In the case where it is judged that the character analysis is to be performed, the multi-function device 10 is capable of performing the character analysis and appropriately determining the output resolution by utilizing the result of the character analysis. In a similar manner, in the case where it is judged that the photo analysis is to be performed, the multi-function device 10 is capable of performing the photo analysis and appropriately determining the output resolution by utilizing the result of the photo analysis. On the other hand, since the multi-function device 10 does not perform the character analysis and/or the photo analysis in the case where it is judged that the character analysis and/or the photo analysis are not to be performed, the multi-function device 10 is capable of reducing the processing load.

(First Modification)

In the first and second embodiments, the user operates the operation unit 12 of the multi-function device 10 to input an instruction for performing the scan to the multi-function device 10. In other words, the first and second embodiments are embodiments of a so-called push scan. Alternatively, after placing the document at the predetermined position of the multi-function device 10, the user may operate an operation unit (not shown) of the PC 80 to input the instruction to perform the scan to the PC 80. In this case, the PC 80 transmits the instruction to perform the scan to the multi-function device 10 in accordance with the scanner driver 96. In other words, in the present modification, a so-called pull scan is performed. In the present modification, the respective units 50 to 66 may be realized by a CPU (not shown) of the PC 80 by executing processes in accordance with the scanner driver 96. In other words, the PC 80 may comprise the plurality of units 50 to 66. In this case, the respective determination units 50, 60 and the judging unit 66 of the PC 80 may determine an optical resolution, determine an output resolution, judge performance of a character analysis, and judge performance of a photo analysis by utilizing tables 40 included in the scanner driver 96. In the present modification, the PC 80 is an example of an "image processing device".

(Second Modification)

A portion of units among the plurality of units 50 to 66 may be realized by the multi-function device 10 by executing processes in accordance with a program in the memory 34, and other units of the plurality of units 50 to 66 may be realized by the CPU of the PC 80 by executing processes in accordance with the scanner driver 96. In the present modification, a combination of the multi-function device 10 and the PC 80 is an example of an "image processing device". In other words, in general terms, the "image processing device" may be realized by a single device as is the case in the respective embodiments and the first modification described above, or may be realized by a combination of two or more devices as is the case in the present modification.

(Third Modification)

In the respective embodiments described above, the smallest character point is calculated in the character analysis. Alternatively, the character analysis may calculate an index value indicating a thinness of the character included in the document, an index value indicating a color of the character included in the document, or an index value indicating a concentration of the character included in the document. In other words, the second analysis unit 58 need only calculate the index value indicating the configuration of the character included in the document.

(Fourth Modification)

In the respective embodiments described above, the edge rate ER that indicates the fineness of the document is calculated in the photo analysis. Alternatively, instead of the index value that indicates the fineness of the document, for example, an index value indicating whether a person is included in the natural image or not may be calculated in the photo analysis. Specifically, the first analysis unit 56 may judge that a person is included in the natural image in a case where there are a predetermined number or more of a specific pixel (in other words, a pixel indicating both "a hue of x or higher and y or lower" and "a chrome of a or higher and b or lower") among the plurality of pixels constituting the scan data, and judges that a person is not included in the natural image in a case where there is not a predetermined number or more of the specific pixel. In addition, in a case where it is judged that a person is included in the natural image, the output resolution determination unit 60 may determine the output resolution in the same manner as the "high fineness" in the respective embodiments, and in the case where it is judged that a person is not included in the natural image, the output resolution determination unit 60 may determine the output resolution in the same manner as the "low fineness" in the respective embodiments. Furthermore, in another modification, the first analysis unit 56 may calculate an index value that indicates the number of colors included (how many different colors are being utilized) in the natural image. In addition, in a case where the number of colors included in the natural image is equal to or greater than a predetermined number, the output resolution determination unit 60 may determine the output resolution in the same manner as the "high fineness" in the respective embodiments, and in a case where the number of colors included in the natural image is smaller than the predetermined number, the output resolution determination unit 60 may determine the output resolution in the same manner as the "low fineness" in the respective embodiments. As shown, the first analysis unit 56 need only calculate the index value for classifying the document including the natural image.

(Fifth Modification)

In the first embodiment, the second analysis unit 58 performs the character analysis and, subsequently, the first analysis unit 56 performs the photo analysis. Alternatively, the first analysis unit 56 may perform the photo analysis and, subsequently, the second analysis unit 58 may perform the character analysis.

(Sixth Modification)

In the respective embodiments described above, both the character analysis and the photo analysis are performed. Alternatively, only the photo analysis may be performed without performing the character analysis (in other words, S100 to S104 in FIG. 4 may be omitted). In addition, two or more types of analyses including the photo analysis and a type of analysis that differs from the character analysis may be performed. In general terms, the image processing device need only comprise the first analysis unit and the second analysis unit need not be provided.

(Seventh Modification)

In the respective embodiments described above, in S20 in FIG. 2, the optical resolution that is utilized in an actual scan is determined from a plurality of optical resolutions. Alternatively, a configuration may be adopted in which a scan of a document is performed solely in accordance with an optical resolution indicating a single value that is determined in advance. In other words, the optical resolution may be fixed. In the present modification, the single value determined in advance is an example of a "specific optical resolution".

(Eighth Modification)

In the respective embodiments described above, the respective functions of the plurality of units 50 to 66 are realized by the CPU 32 of the multi-function device 10 by executing processes in accordance with a program. However, at least one unit among the plurality of units 50 to 66 may be realized by hardware such as a logic circuit.

The invention claimed is:

1. An image processing device comprising:
one or more processors; and
a memory that stores a computer program including instructions executed by the one or more processors,
wherein the instructions cause the one or more processors, when executed by the one or more processors, to function as:
a character configuration analysis unit configured to calculate, by utilizing scan data obtained by a scan of a document including a natural image in accordance with a specific optical resolution, a character configuration index value indicating a configuration of a character included in the document;
a judging unit configured to judge, by utilizing the character configuration index value, whether a document fineness index value indicating a fineness of the document should be calculated, the document fineness index value being a value calculated based on a number of edge pixels in the document;
a document fineness analysis unit configured to
calculate, by utilizing the scan data, the document fineness index value in a case where it is judged that the document fineness index value should be calculated, and
not calculate the document fineness index value in a case where it is judged that the document fineness index value should not be calculated;
an output resolution determination unit configured to
determine an output resolution by utilizing both the character configuration index value and the document fineness index value in a case where it is judged that the document fineness index value should be calculated, the output resolution being a resolution for image data obtained by utilizing the scan data, and
determine the output resolution by utilizing the character configuration index value without utilizing the document fineness index value in a case where it is judged that the document fineness index value should not be calculated;
a conversion unit configured to convert the scan data indicating the specific optical resolution into the image data indicating the output resolution in a case where the output resolution is not identical to the specific optical resolution; and
a creation unit configured to create a file including the image data indicating the output resolution.

2. The image processing device as in claim 1, wherein the output resolution determination unit is configured to:
determine a first value as the output resolution in a case where the document fineness index value indicates that the document has a relatively high fineness, the first value being equal to or lower than the specific optical resolution; and
determine a second value as the output resolution in a case where the document fineness index value indicates that the document has a relatively low fineness, the second value being lower than the first value.

3. The image processing device as in claim 2, wherein the first value is the same value as the specific optical resolution.

4. The image processing device as in claim 1, wherein the output resolution determination unit is configured to:
determine a third value as the output resolution in a case where the document fineness index value indicates that the fineness of the document is a first fineness, and the character configuration index value indicates that the configuration of the character included in the document is a first configuration; and
determine a fourth value being different from the third value as the output resolution in a case where the document fineness index value indicates that the fineness of the document is the first fineness, and the character configuration index value indicates that the configuration of the character included in the document is a second configuration being different from the first configuration.

5. The image processing device as in claim 1, wherein the output resolution determination unit is configured to:
determine a third value as the output resolution in a case where the document fineness index value indicates that the fineness of the document is a first fineness, and the character configuration index value indicates that the configuration of the character included in the document is a first configuration; and
determine a fifth value being different from the third value as the output resolution in a case where the document fineness index value indicates that the fineness of the document is a second fineness being different from the first fineness, and the character configuration index value indicates that the configuration of the character included in the document is the first configuration.

6. The image processing device as in claim 1, wherein the character configuration index value is a value being calculated based on at least one of
a size of the smallest character included in the document,
a thinness of the character included in the document,
a color of the character included in the document, and
a concentration of the character included in the document.

7. A non-transitory computer-readable storage medium storing a computer program for an image processing device, the computer program including instructions executed by one or more processors mounted on the image processing device, the instructions causing the one or more processors, when executed by the one or more processors, to execute:
calculating, by utilizing scan data obtained by a scan of a document including a natural image in accordance with a specific optical resolution, a character configuration index value indicating a configuration of a character included in the document;
judging, by utilizing the character configuration index value, whether a document fi1neness index value indicating a fineness of the document should be calculated, the document fineness index value being a value calculated based on a number of edge pixels in the document;
calculating, by utilizing the scan data, the document fineness index value in a case where it is judged that the document fineness index value should be calculated, and
not calculating the document fineness index value in a case where it is judged that the document fineness index value should not be calculated;

determining an output resolution by utilizing both the character configuration index value and the document fineness index value in a case where it is judged that the document fineness index value should be calculated, the output resolution being a resolution for image data obtained by utilizing the scan data;

determining the output resolution by utilizing the character configuration index value without utilizing the document fineness index value in a case where it is judged that the document fineness index value should not be calculated;

converting the scan data indicating the specific optical resolution into the image data indicating the output resolution in a case where the output resolution is not identical to the specific optical resolution; and creating a file including the image data indicating the output resolution.

8. An image processing device comprising:

one or more processors; and a memory that stores a computer program including instructions executed by the one or more processors, wherein the instructions cause the one or more processors, when executed by the one or more processors, to function as:

a first analysis unit configure to calculate, by utilizing scan data obtained by a scan of a document including a natural image in accordance with a specific optical resolution, a first type of index value indicating a fineness of the document, the first type of index value being calculated based on a number of edge pixels in the document;

a second analysis unit configure to calculate, by utilizing the scan data, a second type of index value indicating a configuration of a character included in the document, the second type of index value being calculated based on at least one of:

a size of the smallest character included in the document;

a thinness of the character included in the document, and a concentration of the character included in the document and an output resolution determination unit configured to determine an output resolution by utilizing both the first type of index value and the second type of index value, the output resolution being a resolution for image data obtained by utilizing the scan data;

a conversion unit configured to convert the scan data indicating the specific optical resolution into the image data indicating the output resolution in a case where the output resolution is not identical to the specific optical resolution; and a creation unit configured to create a file including the image data indicating the output resolution.

* * * * *